United States Patent
Balentine et al.

(10) Patent No.: US 9,354,629 B2
(45) Date of Patent: May 31, 2016

(54) METHODS AND APPARATUS TO CONFIGURE A PROCESS CONTROL SYSTEM USING AN ELECTRONIC DESCRIPTION LANGUAGE SCRIPT

(75) Inventors: James Randall Balentine, Austin, TX (US); Gary Keith Law, Georgetown, TX (US); Mark Nixon, Round Rock, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 127 days.

(21) Appl. No.: 12/389,026

(22) Filed: Feb. 19, 2009

(65) Prior Publication Data

US 2010/0211197 A1 Aug. 19, 2010

(51) Int. Cl.
G06F 9/45 (2006.01)
G05B 19/418 (2006.01)
G05B 19/042 (2006.01)

(52) U.S. Cl.
CPC ...... *G05B 19/41845* (2013.01); *G05B 19/0426* (2013.01); *G05B 2219/31334* (2013.01); *G05B 2219/32142* (2013.01); *Y02P 90/16* (2015.11); *Y02P 90/185* (2015.11)

(58) Field of Classification Search
CPC .......... G06F 8/41; G06F 8/51; G06F 8/45508–8/45512
See application file for complete search history.

(56) References Cited

U.S. PATENT DOCUMENTS

| 4,885,684 | A | * | 12/1989 | Austin ............... G06F 8/30 717/149 |
| 5,050,088 | A | * | 9/1991 | Buckler et al. ............ 700/96 |
| 5,390,314 | A | | 2/1995 | Swanson |
| 5,410,701 | A | * | 4/1995 | Gopalraman ........... G06F 8/433 700/86 |
| 5,428,525 | A | * | 6/1995 | Cappelaere et al. ......... 700/49 |
| 5,790,863 | A | | 8/1998 | Simonyi |
| 5,801,942 | A | * | 9/1998 | Nixon et al. ............. 700/83 |
| 5,828,851 | A | | 10/1998 | Nixon et al. |
| 6,256,635 | B1 | * | 7/2001 | Arrouye et al. |
| 6,330,517 | B1 | * | 12/2001 | Dobrowski et al. ......... 702/104 |

(Continued)

FOREIGN PATENT DOCUMENTS

| EP | 1691245 | 8/2006 |
| JP | H06318105 A | 11/1994 |

(Continued)

OTHER PUBLICATIONS

Profibus Technology and Applicaiton—System Description, published by Profibus Nutzerorganisation e.V., Oct. 2002, pp. 1-36.*
Simatic Component based Automation Getting Started with Simatic iMap, published by Siemens, Dec. 2002, pp. 1-84.*
Unknown Author, "Why Should You Choose EDDL: Easier Calibration," EDDL, www.eddl.org Mar. 3, 2008 (2 pages).
Rolf Birkhofer, XML for Automotion Devices, A Multi-Schema Approach, XML Europe, May 21-25, 2001 (33 pages).

(Continued)

*Primary Examiner* — Tuan Q. Dam
*Assistant Examiner* — Zheng Wei
(74) *Attorney, Agent, or Firm* — Hanley, Flight & Zimmerman, LLC

(57) ABSTRACT

Example methods and apparatus to configure a process control system using an electronic description language (EDL) script are disclosed. A disclosed example method comprises loading a first script representative of a process plant, the first script comprising an interpretive system-level script structured in accordance with an electronic description language, and compiling the first script to form a second script, the second script structured in accordance with a vendor-specific configuration language associated with a particular process control system for the process plant.

22 Claims, 9 Drawing Sheets

(56) References Cited

U.S. PATENT DOCUMENTS

| | | | |
|---|---|---|---|
| 6,446,202 B1* | 9/2002 | Krivoshein et al. | 713/1 |
| 6,618,630 B1 | 9/2003 | Jundt et al. | |
| 6,772,204 B1* | 8/2004 | Hansen | 709/220 |
| 6,948,159 B2* | 9/2005 | Born et al. | 717/143 |
| 7,146,230 B2 | 12/2006 | Glanzer et al. | |
| 7,178,103 B2* | 2/2007 | Humphrey et al. | 715/234 |
| 7,213,478 B2* | 5/2007 | Harada et al. | 73/865.9 |
| 7,251,534 B2 | 7/2007 | Walls et al. | |
| 7,289,861 B2* | 10/2007 | Aneweer et al. | 700/110 |
| 7,317,952 B2 | 1/2008 | Bhandiwad et al. | |
| 7,401,086 B2* | 7/2008 | Chorafakis et al. | |
| 7,676,786 B2* | 3/2010 | Shenfield | G06F 8/10 717/104 |
| 7,707,563 B2* | 4/2010 | Wei | G06F 8/41 717/140 |
| 8,806,456 B2* | 8/2014 | Gazzillo | G06F 8/423 717/142 |
| 2002/0041289 A1* | 4/2002 | Hatch et al. | 345/762 |
| 2003/0048287 A1* | 3/2003 | Little et al. | 345/705 |
| 2003/0135508 A1* | 7/2003 | Chorafakis et al. | 707/100 |
| 2003/0208587 A1 | 11/2003 | Sauer | |
| 2003/0236577 A1* | 12/2003 | Clinton | 700/10 |
| 2004/0059851 A1* | 3/2004 | Donaires | 710/104 |
| 2004/0117775 A1* | 6/2004 | Born et al. | 717/143 |
| 2004/0123091 A1* | 6/2004 | Das | 713/2 |
| 2004/0225491 A1 | 11/2004 | Chang | |
| 2004/0230327 A1* | 11/2004 | Opheim et al. | 700/83 |
| 2004/0230582 A1 | 11/2004 | Pagnano et al. | |
| 2004/0230899 A1 | 11/2004 | Pagnano et al. | |
| 2004/0243933 A1* | 12/2004 | Becker et al. | 715/513 |
| 2005/0015176 A1* | 1/2005 | Harada et al. | 700/121 |
| 2005/0055681 A1* | 3/2005 | Gadre | 717/146 |
| 2005/0071522 A1 | 3/2005 | DeGroot | |
| 2005/0071851 A1* | 3/2005 | Opheim | 719/321 |
| 2005/0149478 A1* | 7/2005 | Fahy | 707/1 |
| 2005/0172220 A1 | 8/2005 | Humphrey et al. | |
| 2006/0074499 A1 | 4/2006 | Hamidpour | |
| 2006/0111794 A1* | 5/2006 | Wysuph et al. | 700/19 |
| 2006/0190112 A1* | 8/2006 | Buesgen et al. | 700/97 |
| 2007/0005805 A1 | 1/2007 | Drath et al. | |
| 2007/0006188 A1* | 1/2007 | Schroth | G06F 8/447 717/140 |
| 2007/0016896 A1 | 1/2007 | Wittmer et al. | |
| 2007/0067725 A1* | 3/2007 | Cahill et al. | 715/733 |
| 2007/0075916 A1 | 4/2007 | Bump et al. | |
| 2007/0078540 A1 | 4/2007 | Bump et al. | |
| 2007/0106761 A1* | 5/2007 | Beoughter et al. | 709/219 |
| 2007/0139441 A1* | 6/2007 | Lucas et al. | 345/619 |
| 2007/0157183 A1* | 7/2007 | Pazel et al. | 717/141 |
| 2007/0165031 A1* | 7/2007 | Gilbert et al. | 345/473 |
| 2007/0179645 A1* | 8/2007 | Nixon et al. | 700/83 |
| 2007/0244583 A1* | 10/2007 | Rachut | 700/83 |
| 2007/0255520 A1 | 11/2007 | Becker et al. | |
| 2007/0282463 A1* | 12/2007 | Hodson et al. | 700/20 |
| 2008/0058969 A1 | 3/2008 | Nixon et al. | |
| 2008/0080395 A1* | 4/2008 | Law et al. | 370/254 |
| 2008/0112388 A1 | 5/2008 | Garrett et al. | |
| 2008/0189441 A1* | 8/2008 | Jundt et al. | 710/3 |
| 2008/0234837 A1* | 9/2008 | Samudrala et al. | 700/19 |
| 2008/0276230 A1* | 11/2008 | Chang | G06F 17/2205 717/142 |
| 2008/0320402 A1* | 12/2008 | Isenmann et al. | 715/762 |
| 2009/0077539 A1* | 3/2009 | Booth | 717/124 |
| 2009/0164985 A1* | 6/2009 | Balko | G06Q 10/06 717/162 |
| 2009/0183139 A1* | 7/2009 | Foti et al. | 717/107 |
| 2009/0204458 A1* | 8/2009 | Wiese et al. | 705/7 |
| 2009/0271726 A1* | 10/2009 | Gavimath et al. | 715/771 |
| 2009/0276486 A1* | 11/2009 | Tandon et al. | 709/203 |
| 2009/0292996 A1* | 11/2009 | Anne et al. | 715/736 |
| 2009/0306964 A1* | 12/2009 | Bonnet et al. | 704/9 |
| 2010/0121999 A1* | 5/2010 | Isenmann et al. | 710/105 |
| 2015/0378694 A1* | 12/2015 | Lagergren | G06F 8/437 717/143 |

FOREIGN PATENT DOCUMENTS

| | | |
|---|---|---|
| JP | H08129483 A | 5/1996 |
| JP | 2001337706 | 12/2001 |
| JP | 2003108220 | 4/2003 |
| JP | 2008140410 | 6/2008 |
| WO | 2005109122 A1 | 11/2005 |
| WO | 2011029887 | 3/2011 |

OTHER PUBLICATIONS

Terry Blevins, "EDDL Overview," NeSSI Meeting, EDDL, Apr. 16, 2007 (69 pages).

Martin Fowler, "Language Workbenches: The Killer-App for Domain Specific Languages?" martinfowler.com; Jun. 12, 2005 (24 pages).

Karlsruhe, "Welcome to the NAMUR EDDL Workshop with ECT," EDDL, May 22, 20006 (47 pages).

Search Report, issued by the UK Patent Office on Jun. 7, 2010, in connection with Great Britain Application No. GB1002596.3, 4 pages.

Philippines Intellectual Property Office, Official Action, issued for Philippines patent application serial No. 12010000052, mailed on Jan. 20, 2012, 2 pages.

European Patent Office, "European Search Report," issued in connection with European application serial No. 10154029.2, mailed Oct. 6, 2011, 6 pages.

UK Intellectual Property Office, "Examination Report," issued in connection with UK Application No. GB1002596.3, May 31, 2013, 3 pages.

Japan Intellectual Property Office, "Office Action," issued in connection with JP Application No. 2010-032263, Oct. 29, 2013, 2 pages.

State Intellectual Property Office of China, "Office Action," issued in connection with CN Application No. 201010129196.6, Sep. 23, 2013, 7 pages.

European Patent Office, "Examination Report", issued in connection with corresponding European Patent Application No. 10154029.2 dated Jan. 27, 2014 (5 pages).

Intellectual Property Office of Great Britain, "Examination Report under Section 18(3)", issued in connection with Great Britain patent application No. GB1002596.3, mailed on Mar. 31, 2014, 4 pages.

State Intellectual Property Office of P.R. China, "Second Office action", issued in connection with Chinese patent application No. 201010129196.6, mailed on Jun. 3, 2014, 7 pages.

Japanese Patent Office, "Decision of Refusal", issued in connection with Japanese patent application No. 2010-032263, mailed on May 7, 2014, 2 pages.

European Patent Office, "Communication pursuant to Article 94(3) EPC", issued in connection with European patent application No. 10154029.2-1807, mailed on Sep. 24, 2014, 9 pages.

Schleipen M: "OPC UA supporting the automated engineering of production monitoring and control systems", IEEE ETFA 2008, Sep. 15, 2008, pp. 640-647.

State Intellectual Property Office of P.R. China, "Decision of Rejection", issued in connection with Chinese patent application No. 201010129196.6, issued on Dec. 3, 2014, 9 pages.

Schleipen et al., "The System-Independent Data Exchange Format CAEX for Supporting an Automatic Configuration of a Production Monitoring and Control System," IEEE International Symposium on Industrial Electronics, Jun. 30, 2008-Jul. 2, 2008 (7 pages).

Yim et al., "Using Process Topology in Plant-Wide Control Loop Performance Assessment," Computers & Chemical Engineering, vol. 31, Issue 2, Dec. 1, 2006 (14 pages).

European Patent Office, "Summons to Attend Oral Proceedings Pursuant to Rule 115(1) EPC," issued in connection to European Patent Application No. 10154029.2, mailed May 27, 2015 (8 pages).

Japan Patent Office, "Notice of Reasons for Rejection," issued in connection with Japanese Patent Application No. 2014-179764, mailed Aug. 4, 2015 (9 pages).

The State Intellectual Property Office of China, "Notification of Reexamination," issued in connection with Chinese Patent Application No. 201010129196.6, issued Dec. 30, 2015 (26 pages).

* cited by examiner

```
<?xml version="1.0" encoding="UTF-8"?>
<xs:schema xmlns:xs="http://www.w3.org/2001/XMLSchema"
    elementFormDefault="qualified" attributeFormDefault="unqualified">
    <xs:element name="CONTROL_SYSTEM">  ──────────── 100
        <xs:annotation>
            <xs:documentation>Comment describing your root
element</xs:documentation>
        </xs:annotation>
        <xs:complexType>
            <xs:sequence>
                <xs:element ref="CONTROLLER"/>  ──────────── 110
                <xs:element ref="WORKSTATION"/>  ──────────── 120
            </xs:sequence>
        </xs:complexType>
    </xs:element>
    <xs:element name="CONTROLLER">  ──────────── 110
        <xs:complexType>
            <xs:sequence>
                <xs:element name="CAPABILITIES">  ──────────── 410
                    <xs:complexType>
                        <xs:attribute name="STD_CONTROL"/>
                        <xs:attribute name="STD_IO"/>
                        <xs:attribute name="ADV_CONTROL"/>
                        <xs:attribute name="DEVICE_ALERTS"/>
                        <xs:attribute name="RED_IO"/>
                    </xs:complexType>
```

FIG. 5

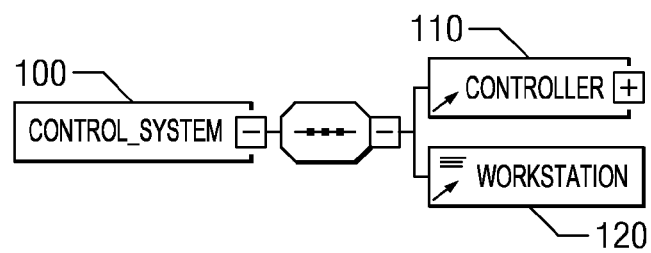

FIG. 6

METHODS AND APPARATUS TO CONFIGURE A PROCESS CONTROL SYSTEM USING AN ELECTRONIC DESCRIPTION LANGUAGE SCRIPT

FIELD OF THE DISCLOSURE

This disclosure relates generally to process control systems and, more particularly, to methods and apparatus to configure a process control system using an electronic description language (EDL) script.

BACKGROUND

Electronic device description languages (EDDLs) have been used to provide a structured and standardized format to describe and specify field devices of process plants to facilitate interpretation, control and/or management of the field devices by the control components of a host process control system. As such, EDDLs typically incorporate standardized interfaces for parameterization and visualization of data associated with the field devices. More recently, EDDLs have been enhanced to describe and/or specify advanced displays and/or graphical representations of field device data.

SUMMARY

A disclosed example method includes loading a first script representative of a process plant, the first script comprising an interpretive system-level script structured in accordance with an electronic description language, and compiling the first script to form a second script, the second script structured in accordance with a vendor-specific configuration language associated with a particular process control system for the process plant.

A disclosed example apparatus includes an editor useable to create a first script representative of a process plant, the first script comprising an interpretable system-level script structured in accordance with an electronic description language, and a compiler to form a second script from the first script, the second script structured in accordance with a vendor-specific configuration language associated with a particular process control system for the process plant.

Another disclosed example method includes utilizing an editor to form a first script representative of a process plant, the first script comprising an interpretive system-level script structured in accordance with an electronic description language, generating a second script from the first script, the second script structured in accordance with a configuration language for a particular process control system, and configuring the process control system for the process plant based on the second script.

BRIEF DESCRIPTION OF THE DRAWINGS

FIG. 5 illustrates an example system-level EDL script that may be used to represent the example schema of FIG. 4.

FIGS. 6-9 illustrate example schema elements that may be used to form a schema for a process control system.

DETAILED DESCRIPTION

In general, the example apparatus, methods, and articles of manufacture described herein may be used to define, describe and/or otherwise specify all or any portion(s) of a process plant control system via an electronic description language (EDL) script and/or an interpretative system-level script. In some EDL script languages, such as those constructed in accordance with an extensible markup language (XML), such EDL scripts are also referred to as schemas. Previously, electronic device description languages (EDDLs) and EDL scripts were only used to define, describe and/or otherwise specify the field devices of a process control system. In contrast, the example EDL scripts described herein are useable to define, describe and/or otherwise specify any number and/or type(s) of additional and/or alternative control and/or non-control components of the process control system. Moreover, the example EDL scripts are useable to define, describe and/or specify any number and/or type(s) of interconnections between any or all components of the process control system. Thus, in some examples, a single schema can be used to define the entirety of a process control system. Example components of a process control system that have not previously been defined via an EDL script include, but are not limited to, a controller, an operator workstation, an input/output (I/O) card, a router, a switch, a hub, a firewall, a power supply, and/or an I/O gateway.

The example EDL scripts described herein are constructed to support process control system components manufactured, provided and/or implemented by any process control system vendor. Accordingly, as described more fully below in connection with FIG. 3, such EDL scripts can subsequently be compiled, translated, interpreted and/or otherwise processed to form one or more vendor-specific and/or system-specific scripts that may then be loaded into and/or otherwise used to configure particular process control system components from any number of particular component vendors. As such, such vendor and/or system-specific scripts are generally structured in accordance with a vendor-specific configuration language.

Figure 1:
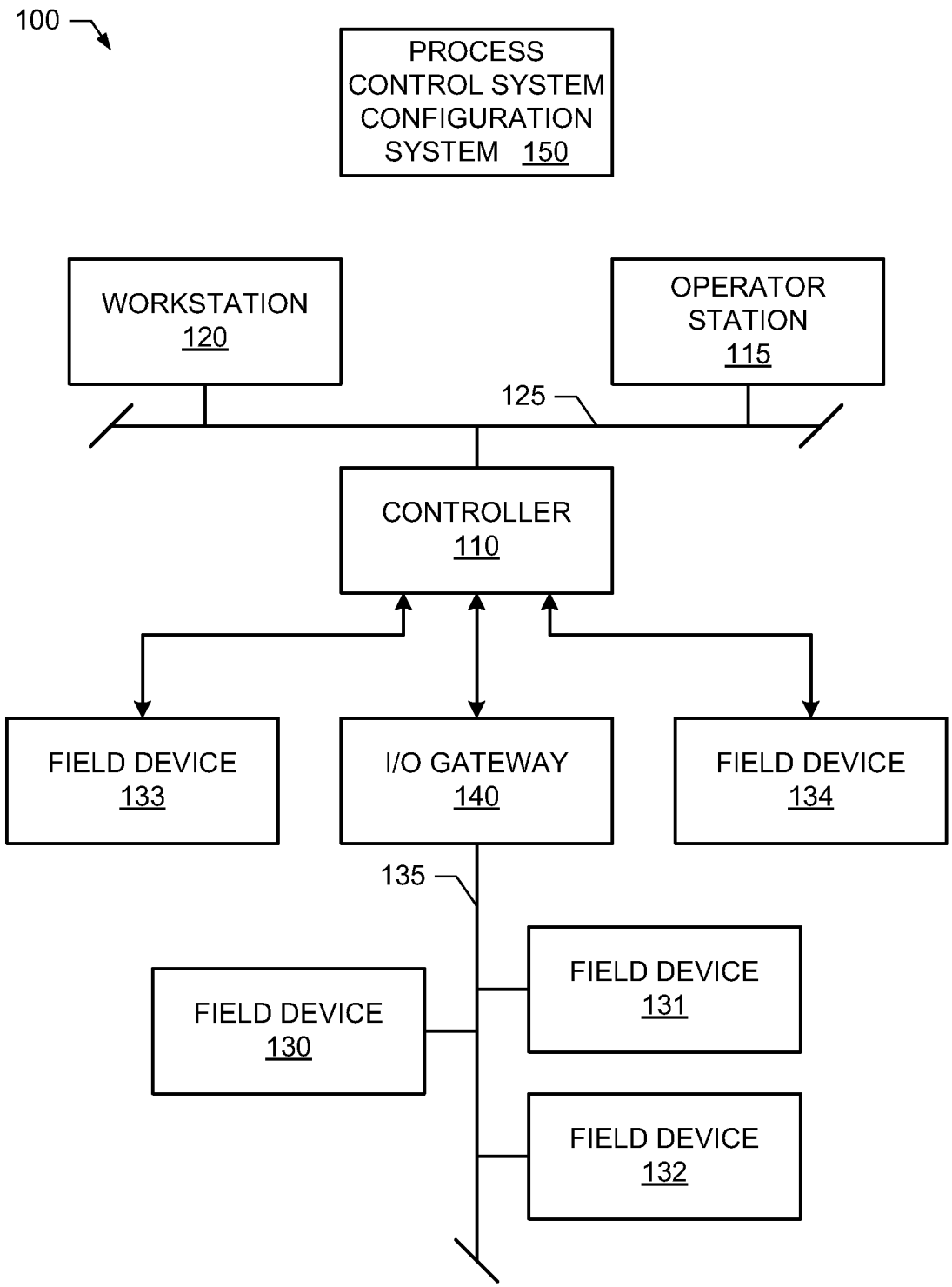
FIG. 1 is a schematic illustration of an example process control system constructed in accordance with the teachings of this disclosure.

FIG. 1 is a schematic illustration of an example process control system 100. In the interest of brevity and clarity, throughout the following disclosure references will be made to the example process control system 100 of FIG. 1. However, the methods and apparatus described herein to define, specify, describe and/or configure a process control system based on EDL scripts are applicable to other process control systems. The example process control system 100 of FIG. 1 includes one or more process controllers (one of which is designated at reference numeral 110), one or more operator stations (one of which is designated at reference numeral 115), and one or more workstations (one of which are designated at reference numeral 120). The example process controller 110, the example operator station 115 and the workstation 120 are communicatively coupled via a bus and/or local area network (LAN) 125, which is commonly referred to as an application control network (ACN).

The example operator station 115 of FIG. 1 allows a process plant operator to review and/or operate one or more operator display screens and/or applications that enable the process plant operator to view process plant variables, view process plant states, view process plant conditions, view process plant alarms, and/or to change process plant settings (e.g., set points and/or operating states, clear alarms, silence alarms, etc.). Such screens and/or applications are typically designed and/or implemented by process configuration engineers.

The example workstation 120 of FIG. 1 may be configured as an application station to perform one or more information technology applications, user-interactive applications and/or communication applications. For example, the workstation 120 may be configured to perform primarily process control-related applications, while another application station (not shown) may be configured to perform primarily communication applications that enable the process control system 100 to communicate with other devices or systems using any desired communication media (e.g., wireless, hardwired, etc.) and protocols (e.g., HTTP, SOAP, etc.). The example operator station 115 and the example workstation 120 of FIG. 1 may be implemented using one or more workstations and/or any other suitable computer systems and/or processing systems. The operator station 115 and/or workstation 120 could, for example, be implemented using single processor personal computers, single or multi-processor workstations, etc.

The example LAN 125 of FIG. 1 may be implemented using any desired communication medium and protocol. For example, the LAN 125 may be based on a wired and/or wireless Ethernet communication scheme. However, as will be readily appreciated by those having ordinary skill in the art, any other suitable communication medium(s) and/or protocol(s) could be used. Further, although a single LAN 125 is illustrated in FIG. 1, more than one LAN and/or other alternative pieces of communication hardware may be used to provide redundant communication paths within the example system 100 of FIG. 1.

The example controller 110 of FIG. 1 is coupled to a plurality of smart field devices 130, 131 and 132 via a digital data bus 135 and an input/output (I/O) gateway 140. The smart field devices 130-132 may be Fieldbus compliant valves, actuators, sensors, etc., in which case, the smart field devices 130-132 communicate via the digital data bus 135 using the well-known Foundation Fieldbus protocol. Of course, other types of smart field devices and communication protocols could be used instead. For example, the smart field devices 130-132 could instead be Profibus and/or HART compliant devices that communicate via the data bus 135 using the well-known Profibus and HART communication protocols. Additional I/O devices, which are different, similar and/or identical to the I/O gateway 140, may be coupled to the controller 110 to enable additional groups of smart field devices, which may be Foundation Fieldbus devices, HART devices, etc., to communicate with the controller 110.

In addition to the example smart field devices 130-132, one or more non-smart field devices 133 and 134 may be communicatively coupled to the example controller 110. The example non-smart field devices 133 and 134 of FIG. 1 may be, for example, conventional 4-20 milliamp (mA) or 0-10 volts direct current (VDC) devices that communicate with the controller 110 via respective links.

The example controller 110 of FIG. 1 may be, for example, a DeltaV™ controller sold by Fisher-Rosemount Systems, Inc., an Emerson Process Management company. However, any other controller could be used instead. Further, while only one controller 110 is shown in FIG. 1, additional controllers and/or process control platforms of any desired type and/or combination of types could be coupled to the LAN 125. In any case, the example controller 110 performs one or more process control routines associated with the process control system 100 that have been generated by a system engineer and/or other system operator using the operator station 115 and which have been downloaded to and/or instantiated in the controller 110.

To configure the control components of the example process control system 100 (for example, the example controller 110, the example operator station 115, the example workstation 120, the example I/O gateway 140 and/or the example field devices 130-134) based on one or more EDL scripts, the example process control system 100 of FIG. 1 includes a process control system configuration system 150. As described below in connection with FIG. 2, the example process control system configuration system 150 of FIG. 1 includes an editor 210 (FIG. 2) to allow a user to create an EDL and/or interpretative script and/or schema that represents in a vendor and/or system non-specific manner possibly all of the process control system 100, and a compiler 220 to generate vendor and/or system specific configuration and/or operation databases based on the EDL script and/or schema. The vendor-specific configuration and/or operation database include one or more vendor-specific scripts, information and/or data that can be used to actually configure specific makes and models of control components of the example process control system 100 and/or are structured in accordance with a vendor-specific configuration language.

While FIG. 1 illustrates an example process control system 100 within which the example apparatus, methods, and articles of manufacture to define, describe and/or otherwise specify all or any portion(s) of a process plant control system via an EDL script described in greater detail below may be advantageously employed, persons of ordinary skill in the art will readily appreciate that the apparatus, methods, and articles of manufacture described herein may, if desired, be advantageously employed in other process plants and/or process control systems of greater or less complexity (e.g., having more than one controller, across more than one geographic location, etc.) than the illustrated example of FIG. 1. Moreover, while not shown in FIG. 1 for clarity of illustration, there may be any number and/or type(s) of additional and/or alternative devices, components and/or systems included in a process plant and/or a process control system. For example, a process plant and/or a process control system may include and/or implement a firewall, a switch, a router, a hub, a power supply, and/or any other devices managed and/or controllable by a process control system, such as the DeltaV process control system sold by Fisher-Rosemount Systems, Inc., an Emerson Process Management company.

Figure 2:
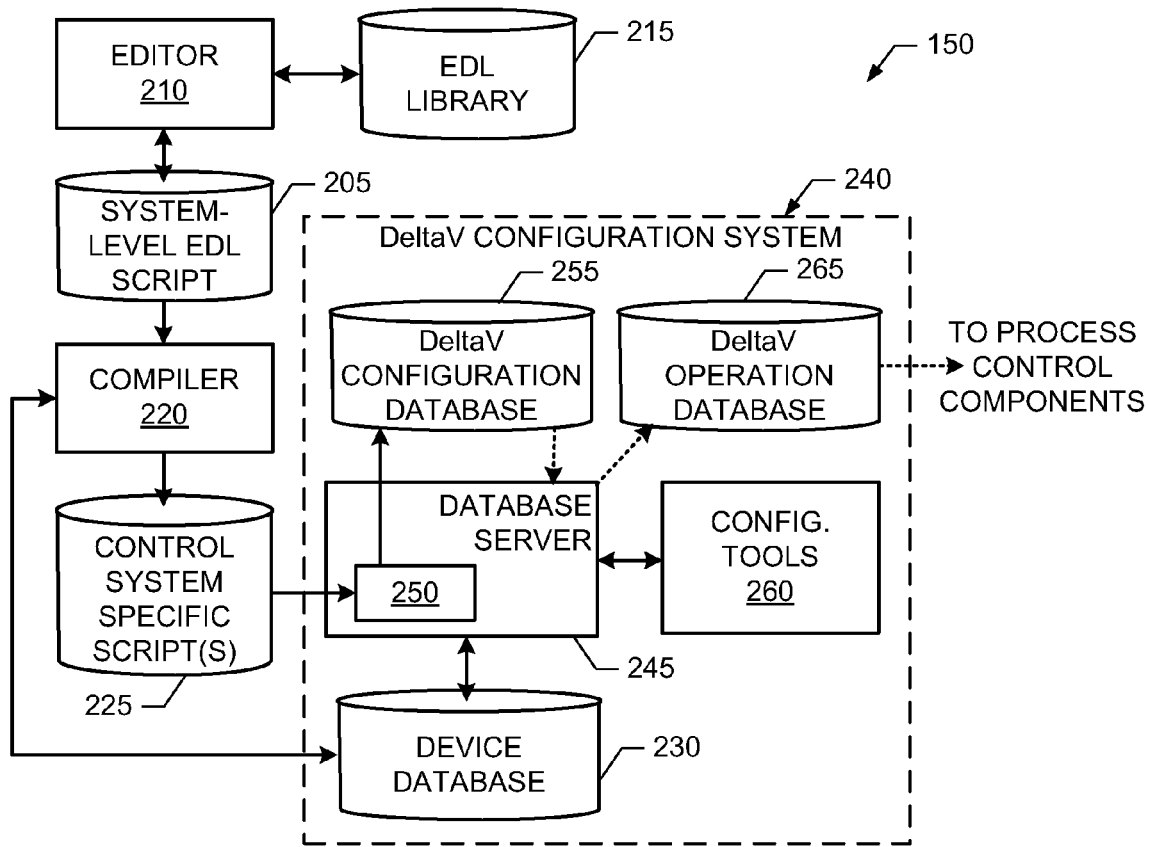
FIG. 2 illustrates an example manner of implementing the example process plant configuration system of FIG. 1.

FIG. 2 illustrates an example manner of implementing the example process control system configuration system 150 of FIG. 1. To allow a user to create an EDL script and/or schema 205 that represents a process control system, such as the example system 100 of FIG. 1, the example configuration system 150 of FIG. 2 includes any number and/or type(s) of EDL editors, one of which is designated at reference numeral 210, and an EDL library 215. An example schema and EDL script 205 that may be used to represent the example process control system 100 of FIG. 1 are shown below in connection with FIGS. 4 and 5, respectively. The example EDL library 215 of FIG. 1 contains a plurality of EDL-based schemas and/or descriptions for any number and/or type(s) of process control system components and/or process control system interconnections that may be selected and/or used to construct the example EDL script 205. Example schemas for some example process control system components that may be included in the example EDL library 215 are shown below in FIGS. 5-9. A portion of another example EDL script 205 that can be created from the example schema elements of FIGS. 8 and 9 is shown in FIG. 10.

The example EDL editor 210 may be configured to create, modify, view and/or edit XML-based schemas and/or EDL scripts 205 and may, for example, be implemented using XMLSpy® from Altova®. However, any EDL editor 210 may be used instead. Utilizing one or more user interfaces and/or menus of the example EDL editor 210, a user interacts with the example EDL editor 210 of FIG. 2 to create the example EDL script 205. For example, the user may interact with the EDL editor 210 to select, connect and/or configure schema elements from the EDL library 215 to form a vendor and/or system independent representation of (that is, a schema for) the example process control system 100 of FIG. 1.

To compile the example EDL-script 205, the example process control system configuration system 150 of FIG. 2 includes the example compiler 220. The example compiler 220 of FIG. 2 generates and/or forms the vendor-specific control system configuration scripts, files and/or data 225 based on the vendor non-specific EDL script 205. The example compiler 220 may generate the vendor-specific information 225 by compiling, translating and/or otherwise processing the EDL script 205. An example manner of implementing the example compiler 220 of FIG. 2 is described below in connection with FIG. 3.

While forming the system-specific configuration information 225, the example compiler 220 of FIG. 2 may access and/or query a device database 230 for device-specific information and/or data. The example device database 230 of FIG. 2 contains information regarding the interfaces and/or methods implemented by specific control system components. For example, the EDL script 205 may include a reference to a generic I/O gateway. When that generic I/O gateway reference is processed by the example compiler 220, the compiler 220 obtains data and/or information from the device database 230 that is specific to the make and model of the I/O gateway 140 included in the example process control system 100, and includes and/or incorporates such data and/or information in the system-specific configuration script(s) 225.

As shown in FIG. 2, the example device database 230 is implemented in connection with a vendor-specific configuration system 240. The example system specific configuration system 240 of FIG. 2 is a part of the DeltaV process control system sold by Fisher-Rosemount Systems, Inc., an Emerson Process Management company. To allow the example process control system configuration script(s) and/or information 225 to be imported, the example DeltaV configuration system 240 of FIG. 2 includes a database server 245 having an import and/or database population module 250. The example import module 250 of FIG. 2 imports data, files and/or other configuration information from the example system specific script(s) 225 and stores the imported data, files and/or configuration information in a DeltaV configuration database 255. As configured via, for example, one or more configuration tools 260, the example database server 245 of FIG. 2 creates a DeltaV operation database 265 based on and/or from data, files and/or other configuration information stored in the DeltaV configuration database 255. The actual (i.e., physical) process control components of the process control system 100 are loaded, configured and/or programmed based on the thus formed example DeltaV operation database 265. While the example system-specific configuration script(s) 225 of FIG. 2 are generated by the example compiler 220, any portion of the system-specific configuration script(s) 225 may, additionally or alternatively, be generated using other tools and/or interfaces (not shown) of, for example, the DeltaV process control system.

While an example manner of implementing the example process control system configuration system 150 of FIG. 1 has been illustrated in FIG. 2, one or more of the interfaces, data structures, elements, processes and/or devices illustrated in FIG. 2 may be combined, divided, re-arranged, omitted, eliminated and/or implemented in any other way. For example, the configuration system 240 may include configuration system modules specific to any number of additional and/or alternative process control systems from other vendors. Further, the example EDL editor 210, the example EDL script 205, the example EDL library 215, the example compiler 220, the example system-specific script(s) 225, the example device database 230, the example DeltaV configuration system 240, the example database server 245, the example import module 250, the example DeltaV configuration database, the example configuration tools 260, the example DeltaV operation database 265 and/or, more generally, the example process control system configuration system 150 of FIG. 2 may be implemented by hardware, software, firmware and/or any combination of hardware, software and/or firmware. Thus, for example, any or the example EDL editor 210, the example EDL script 205, the example EDL library 215, the example compiler 220, the example system-specific script(s) 225, the example device database 230, the example DeltaV configuration system 240, the example database server 245, the example import module 250, the example DeltaV configuration database, the example configuration tools 260, the example DeltaV operation database 265 and/or, more generally, the example process control system configuration system 150 may be implemented by one or more circuit(s), programmable processor(s), application specific integrated circuit(s) (ASIC(s)), programmable logic device(s) (PLD(s)) and/or field programmable logic device(s) (FPLD(s)), etc. Further still, the process control system configuration system 150 may include interfaces, data structures, elements, processes and/or devices instead of, or in addition to, those illustrated in FIG. 2 and/or may include more than one of any or all of the illustrated interfaces, data structures, elements, processes and/or devices.

Figure 3:
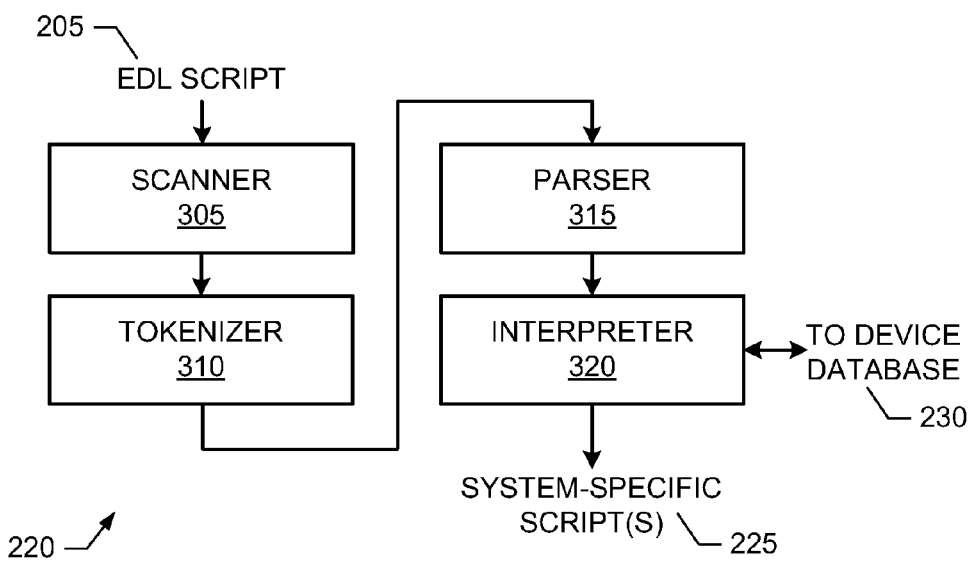
FIG. 3 illustrates an example manner of implementing the example compiler of FIG. 2.

FIG. 3 illustrates an example manner of implementing the example compiler 220 of FIG. 2. To identify categorized blocks of text (that is, tokens) within the EDL script 205, the example compiler 220 of FIG. 3 includes a scanner 305 and a tokenizer 3 10. Using any number and/or type(s) of algorithm(s), logic and/or method(s), the example scanner 305 of FIG. 3 scans and/or parses the EDL script 205 to identify the lexemes within the EDL script 205, that is, to identify particular types of strings of characters contained in the EDL script 205. Example lexemes include, but are not limited to, a string of letters, a string of numbers, a punctuation mark, a mathematical operator, etc. Using any number and/or type(s) of algorithm(s), logic and/or method(s), the example tokenizer 310 of FIG. 3 processes the lexemes identified by the scanner 305 to identify particular tokens, that is, classifiable strings of input characters. For example, the scanner 305 may identify a string-of-letters lexeme representing, for example, a sentence, which the example tokenizer 310 demarcates and/or separates into one or more words. Each token identified by the tokenizer 310 has both a value (e.g., the actual name of a variable) and a type (e.g., a variable, an operator, a number, etc.).

To perform syntactic analysis, the example compiler 220 of FIG. 3 includes a parser 315. Using any number and/or type(s) of algorithm(s), logic and/or method(s), the example parser 315 of FIG. 3 processes and/or analyzes the tokens identified by the example tokenizer 310 to identify and/or determine their relationship(s) with respect to the grammar of the EDL script 205. In other words, the example parser 315 identifies the expressions contained within the EDL script 205.

To translate the expressions identified by the example parser 315 into a vendor and/or system specific form, the example compiler 220 of FIG. 3 includes an interpreter 320. Using any number and/or type(s) of algorithm(s), logic and/or method(s), the example interpreter 320 of FIG. 3 translates each identified expression of the EDL script 205 into a corresponding vendor-specific expression that represents a corresponding action for a particular make and model of control system component. For example, the EDL script 205 may contain an expression assigning a value to an upper limit threshold of a generic temperature gauge. Thus, the interpreter 320 generates one or more corresponding vendor-specific expressions and/or configuration statements 225 that correctly configure the upper temperature limit for a particular make and model of temperature gauge implemented within the process control system 100. In such an example, the example interpreter 320 can obtain the vendor-specific configuration language expressions to correctly configure that make and model of temperature gauge from the device database 230.

While an example manner of implementing the example compiler 220 of FIG. 2 has been illustrated in FIG. 3, one or more of the interfaces, data structures, elements, processes and/or devices illustrated in FIG. 3 may be combined, divided, re-arranged, omitted, eliminated and/or implemented in any other way. Further, the example scanner 305, the example tokenizer 310, the example parser 315, the example interpreter 320 and/or, more generally, the example compiler 220 of FIG. 3 may be implemented by hardware, software, firmware and/or any combination of hardware, software and/or firmware. Thus, for example, any or the example scanner 305, the example tokenizer 310, the example parser 315, the example interpreter 320 and/or, more generally, the example compiler 220 may be implemented by one or more circuit(s), programmable processor(s), ASIC(s), PLD(s) and/or FPLD(s), etc. Further still, the compiler 220 may include interfaces, data structures, elements, processes and/or devices instead of, or in addition to, those illustrated in FIG. 3 and/or may include more than one of any or all of the illustrated interfaces, data structures, elements, processes and/or devices.

Figure 4:
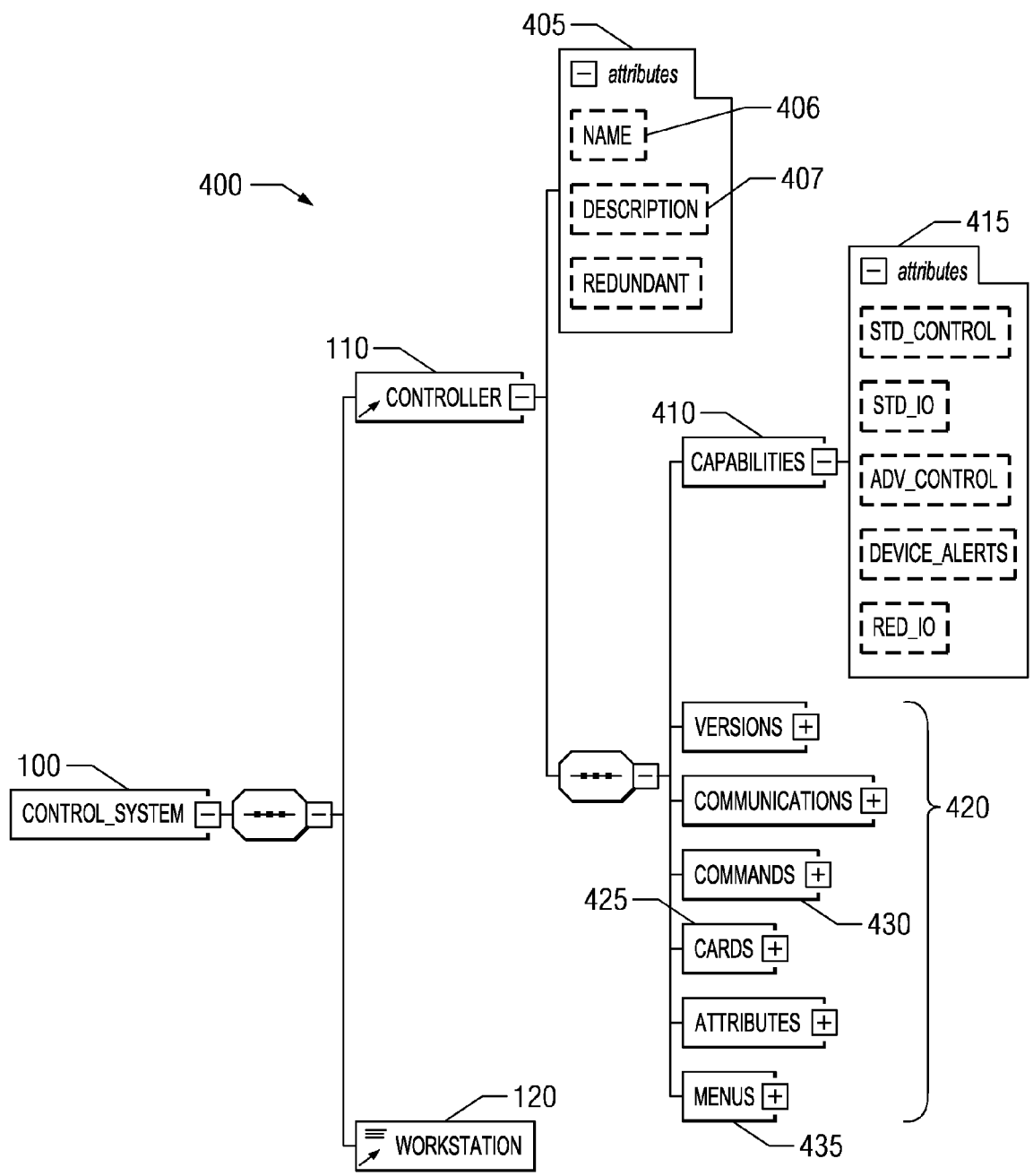
FIG. 4 illustrates an example schema that may be used to graphically represent the example process control system of FIG. 1.

FIG. 4 illustrates an example schema 400 that may be used to graphically represent the example process control system 100 of FIG. 1. As shown in FIG. 4, the example process control system 100 includes the example workstation 120 and the example process controller 110 of FIG. 1. The example controller 110 of FIG. 4 has a set of attributes 405 that includes, among other things, a name 406 and a description 407. The example controller 110 of FIG. 4 also has a set of capabilities 410, which are defined and/or specified as a set of attributes 415, and any number and/or type(s) of additional properties 420. For example, the controller 110 may include: (a) one or more interface cards 425 that allow the controller 110 to communicate with other components of the example process control system 100 (for example, any of the example field devices 130-134 and/or the example I/O gateway 140 of FIG. 1), (b) commands 430 that define and/or permit the execution of operations, such as calibration, self-diagnosis, etc., and/or (c) menus 435 may be used to implement a first-level interface structure without having to use a specialized programming language. The example commands 430 of FIG. 4 could be defined such that the commands are automatically inserted into the menu structure 435 of the corresponding component. The example menus 435 of FIG. 4 may be used to allow a user to access basic operations of the corresponding element, such as configuration, run-time operation and/or diagnostics. While only a portion of the example process control system 100 is depicted in FIG. 4, persons of ordinary skill in the art will readily appreciate that all or any portion of a process control system can be depicted via a schema diagram in a manner similar to that shown in FIG. 4.

FIG. 5 illustrates an example EDL script 500 that may be used to represent the example schema 400 of FIG. 4 and, thus, to implement the example EDL script 205 of FIG. 2. The example EDL script 500 of FIG. 5 is constructed in accordance with XML. The process control system 100 of the example EDL script 500 of FIG. 5 references the controller 110 and the workstation 120 via corresponding XML expressions. Likewise, the controller 110 references the example capabilities 410 of FIG. 4. While only a portion of the example schema 400 of FIG. 4 is depicted in the example EDL script 500 of FIG. 5, persons of ordinary skill in the art will readily appreciate that all or any portion of a process control system schema and, thus, a process control system can be expressed in an EDL script in a manner similar to that shown in FIG. 5.

Figure 7:
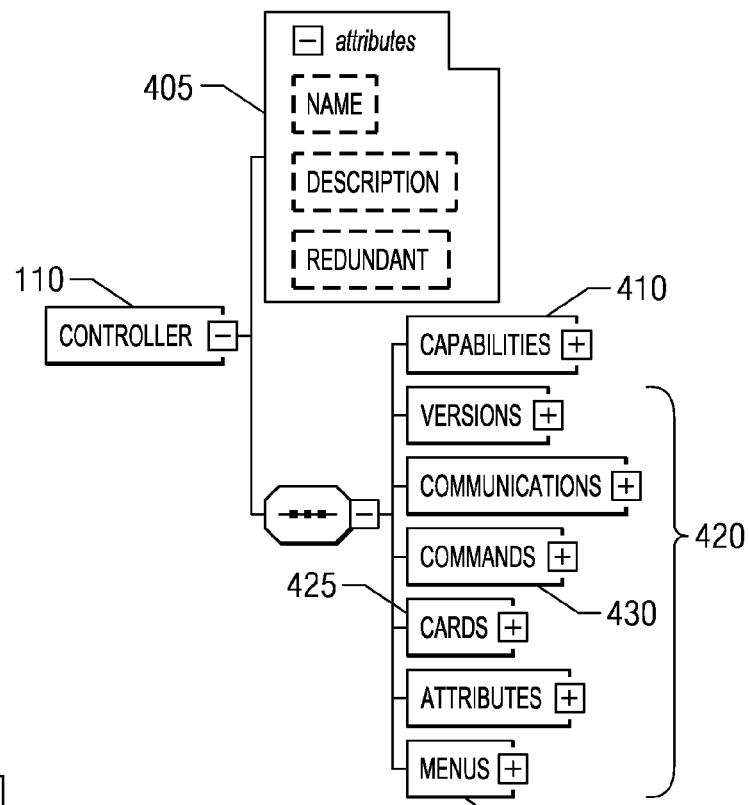
Figure 8:
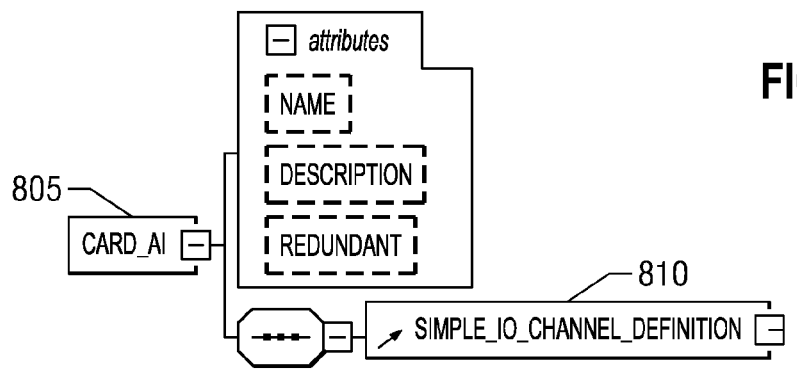
Figure 9:
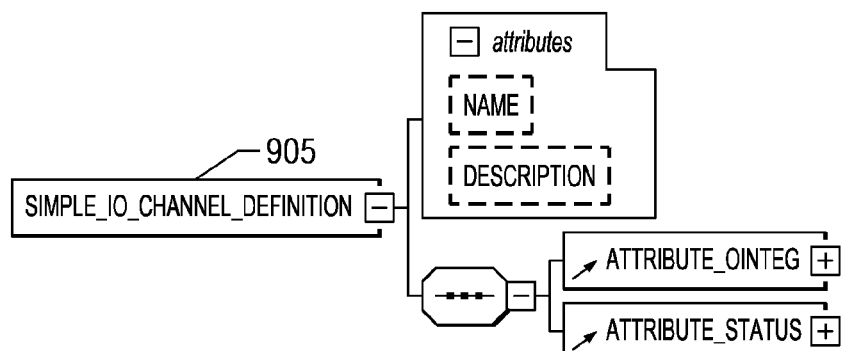
Figure 10:
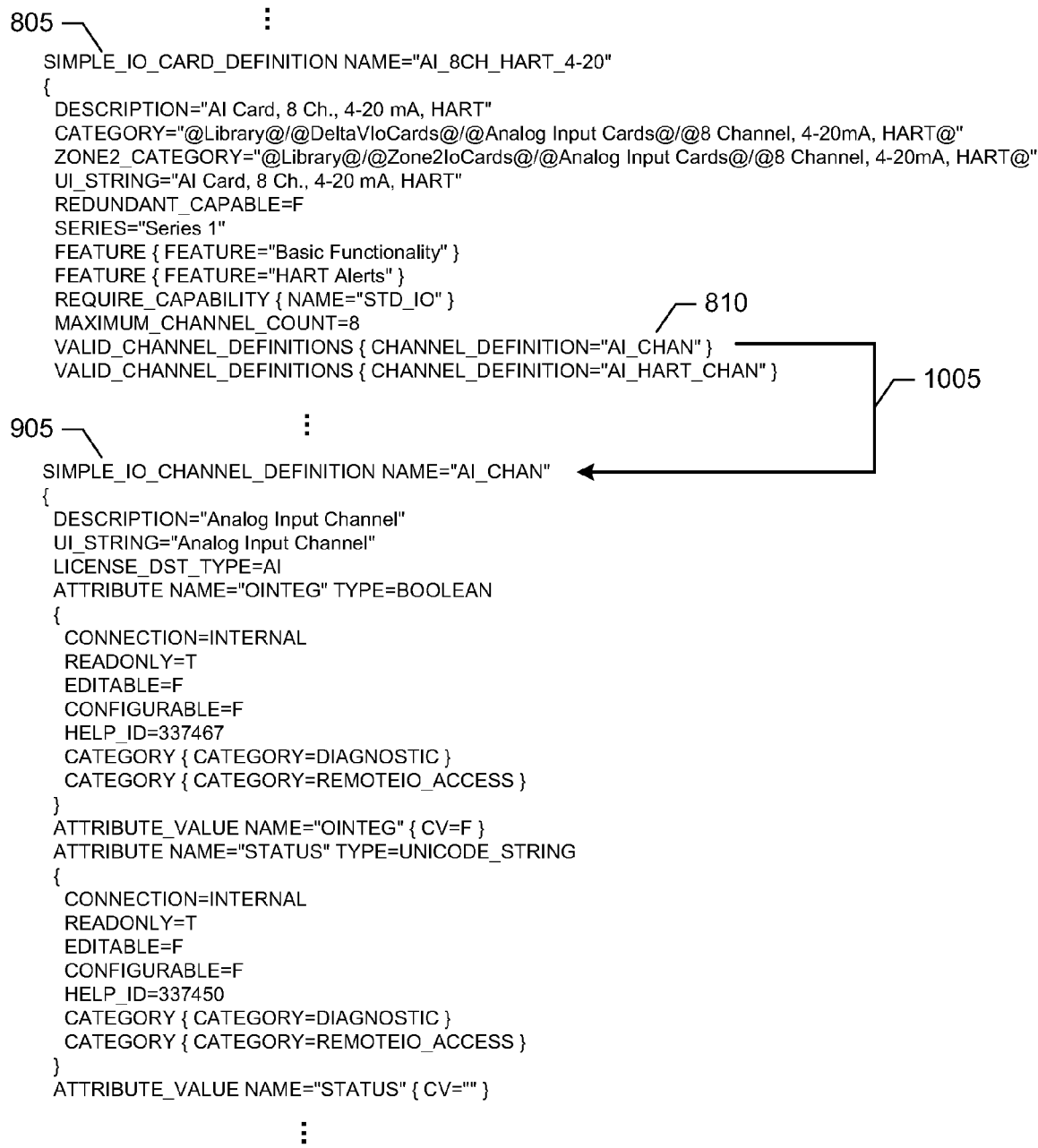
FIG. 10 illustrates an example system-level EDL script constructed from the example schema elements of FIGS. 8 and 9.

FIGS. 6-9 illustrate some example graphical schema elements that may be used and/or combined to depict and/or define a process control system. The example schema elements of FIGS. 6-9 may be included in a plurality of schemas stored in and/or accessible from the example EDL library 215 of FIG. 2. The example schema element of FIG. 6 depicts a process control system 100 including the controller 110 and the workstation 120. The example schema element of FIG. 7 depicts the process controller 110 having the attributes 415, the capabilities 410, other properties 420, cards 425, commands 430 and menus 435. The illustrated example of FIG. 4 is an example combination of the example schema elements of FIGS. 6 and 7.

FIG. 8 illustrates an example schema that may be used to depict and/or define an interface card 805 to be assigned to and/or linked to, for example, a card 425 of the example controller schema of FIG. 7. The example schema of FIG. 9 depicts and/or defines an I/O channel 905 that may be assigned to and/or linked to, for example, an I/O channel 810 of the example interface card 805 of FIG. 8.

FIG. 10 illustrates a portion of an example EDL script that represents a combination of the example schema elements of FIGS. 8 and 9. In the illustrated example of FIG. 10, the example I/O channel 905 of FIG. 9 is linked to the I/O channel 810 of the example interface card 805 of FIG. 8, as depicted with line 1005.

Figure 11:
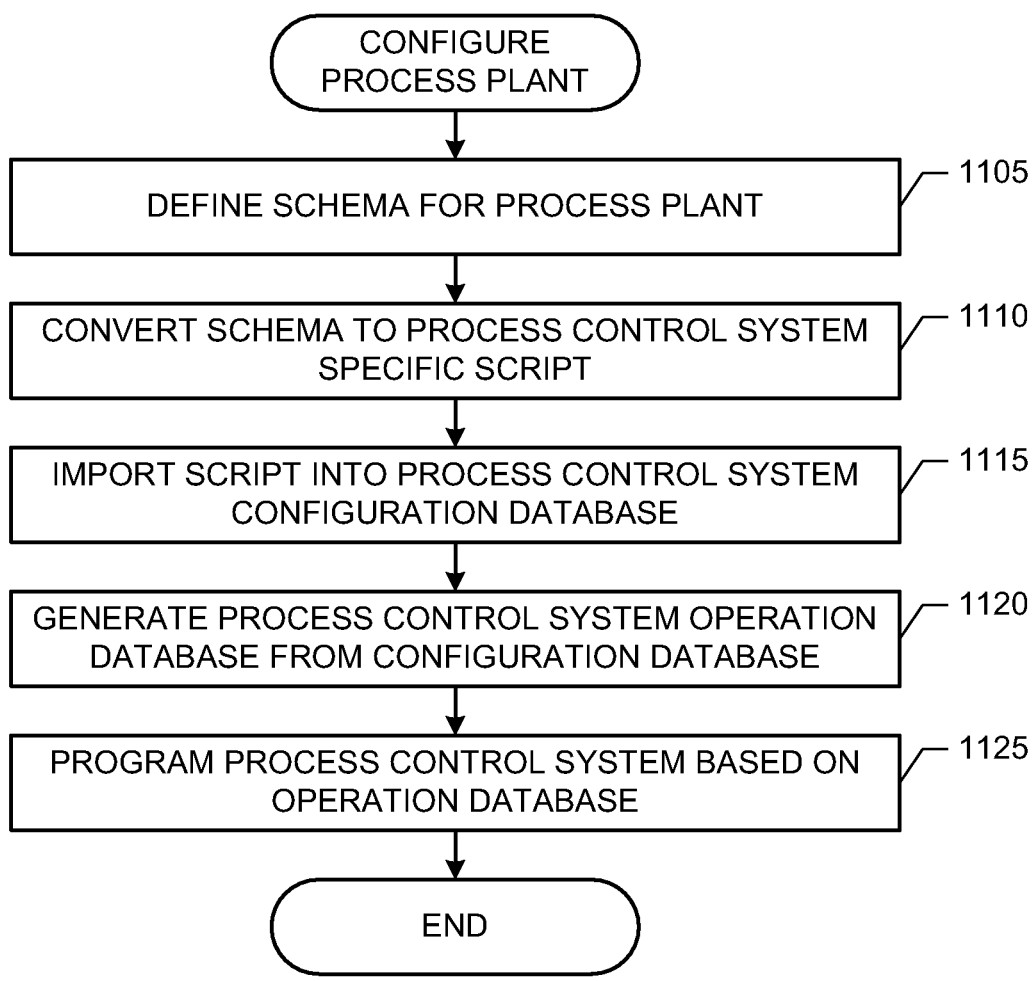
FIG. 11 is a flowchart representative of an example process that may be used to configure the example process control system of FIG. 1 based on a system-level EDL script.
Figure 12:
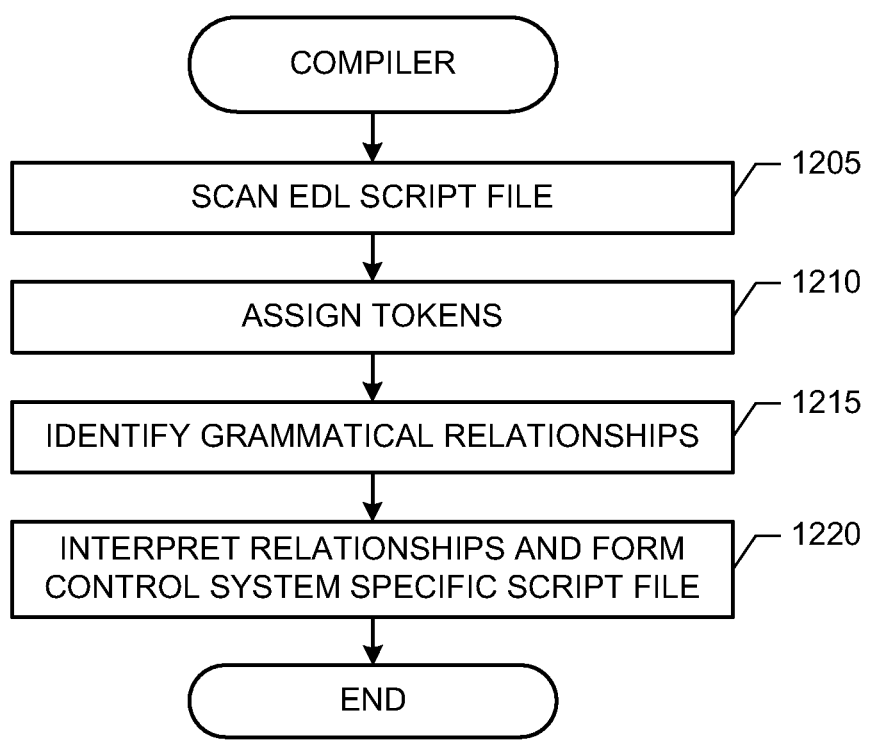
FIG. 12 is a flowchart representative of an example process that may be used to convert a system-level EDL script into a process control system specific configuration script.

FIG. 11 illustrates a flowchart representative of an example process that may be carried out to configure the example process control system 100 based on an EDL schema and/or script. FIG. 12 illustrates a flowchart representative of an example process that may be carried out to implement the example compiler 220 of FIGS. 2 and 3. The example processes of FIGS. 11 and 12 may be carried out by a processor, a controller and/or any other suitable processing device. For example, the example processes of FIGS. 11 and 12 may be embodied in coded instructions stored on any tangible computer-readable medium such as a flash memory, a compact disc (CD), a digital versatile disc (DVD), a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-accessible instructions or data structures, and which can be accessed by a processor, a general-purpose or special-purpose computer, or other machine with a processor (e.g., the example processor platform P100 discussed below in connection with FIG. 13). Combinations of the above are also included within the scope of computer-readable media. Machine-accessible instructions comprise, for example, instructions and/or data that cause a processor, a general-purpose computer, special-purpose computer, or a special-purpose processing machine to implement one or more particular processes. Alternatively, some or all of the example processes of FIGS. 11 and 12 may be implemented using any combination(s) of ASIC(s), PLD(s), FPLD(s), discrete logic, hardware, firmware, etc. Also, some or all of the example processes of FIGS. 11 and 12 may instead be implemented manually or as any combination of any of the foregoing techniques, for example, any combination of firmware, software, discrete logic and/or hardware. Further, many other methods of implementing the example operations of FIGS. 11 and 12 may be employed. For example, the order of execution of the blocks may be changed, and/or one or more of the blocks described may be changed, eliminated, sub-divided, or combined. Additionally, any or all of the example processes of FIGS. 11 and 12 may be carried out sequentially and/or carried out in parallel by, for example, separate processing threads, processors, devices, discrete logic, circuits, etc.

The example process of FIG. 11 begins with the use of the example EDL editor 210 to create and/or generate of a schema and/or an EDL script 205, such as the example schema 400 of FIG. 4 and/or the example EDL script 500 of FIG. 5, for the example process control system 100 (block 1105). The example compiler 220 is executed and/or operated to create a system and/or vendor-specific data and/or configuration information 225 from the EDL script 205 (block 1110).

Using the example import and/or database population module 250, the system and/or vendor-specific data and/or configuration information 225 is imported into the system and/or vendor-specific configuration database 255 (block 1115). The example database server 245 is operated and/or executed to form the system and/or vendor-specific operation database 265 based on the configuration database 255 (block 1120). The process control system 100 is configured, loaded and/or programmed from the operation database 265 (block 1125). Control then exits from the example process of FIG. 11.

The example process of FIG. 12 begins with the example scanner 305 of FIG. 3 scanning the EDL script file 205 to identify the lexemes contained in the EDL script file 205 (block 1205). The example tokenizer 310 identifies tokens contained in the EDL script file 205 based on the identified lexemes (block 1210).

Based on the tokens identified by the tokenizer 310, the example parser 315 of FIG. 3 analyzes the tokens to determine the grammatical relationships between the tokens (block 1215). The example interpreter 320 translates the identified grammatical relationships into expressions, data and/or configuration information 225 that are specific to particular make(s) and/or model(s) of process control system components (block 1220). Control then exits from the example process of FIG. 12.

Figure 13:
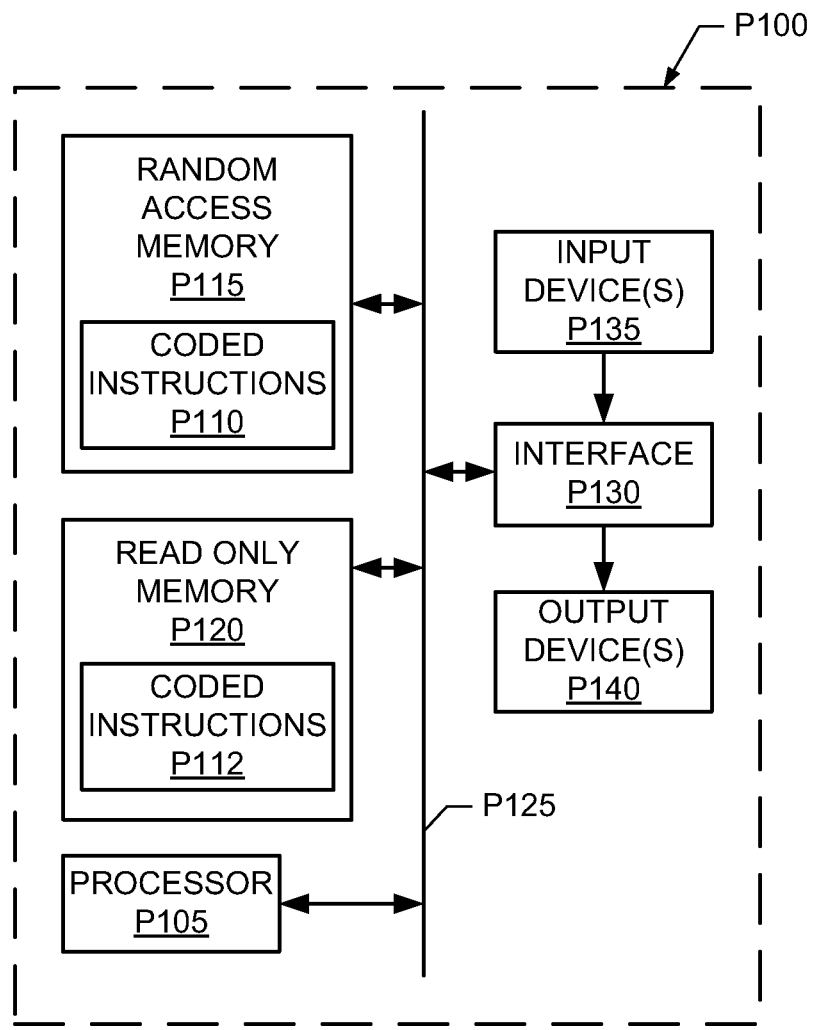
FIG. 13 is a schematic illustration of an example processor platform that may be used and/or programmed to carry out the example processes of FIGS. 11 and/or 12 and/or, more generally, to implement the example process plant configuration system of FIGS. 1 and 2.

FIG. 13 is a schematic diagram of an example processor platform P100 that may be used and/or programmed to implement the example process control system configuration system 150 and/or the example compiler 220 of FIGS. 1, 2 and 3. For example, the processor platform P100 can be implemented by one or more general-purpose processors, processor cores, microcontrollers, etc.

The processor platform P100 of the example of FIG. 13 includes at least one general-purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 11 and/or 12 to implement the example methods and apparatus described herein.

The processor P105 is in communication with the main memory (including a ROM P120 and/or the RAM P115) via a bus P125. The RAM P115 may be implemented by dynamic random access memory (DRAM), synchronous dynamic random-dom access memory (SDRAM), and/or any other type of RAM device(s), and ROM may be implemented by flash memory, EPROM, EEPROM, a CD, a DVD and/or any other desired type of memory device(s). Access to the memory P115 and the memory P120 may be controlled by a memory controller (not shown). The example memory P115 may be used to implement the example EDL script 205, the example EDL library 215, the example system and/or vendor-specific script(s) 225, the example device database 230, the example configuration database 225 and/or the example operation database 265.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

Although certain example methods, apparatus and articles of manufacture have been described herein, the scope of coverage of this patent is not limited thereto. Such example are intended to be non-limiting illustrative examples. On the contrary, this patent covers all methods, apparatus and articles of manufacture fairly falling within the scope of the appended claims either literally or under the doctrine of equivalents.

What is claimed is:

1. A method comprising:
loading an interpretable system-level vendor-independent first script defining a physical topology and control of a process control system including multiple process controllers and process control devices, the first script including tokens that have a type and value to define attributes of the multiple process controllers and process control devices, the topology representing physical communicative couplings between the multiple process controllers and the process control devices; and
compiling the first script to form a second script with vendor-specific configuration language by identifying one or more lexemes contained in the first script, identifying the tokens contained in the first script based on the identified one or more lexemes, identifying one or more first expressions based on grammatical relationships between the identified tokens, identifying vendor-specific information associated with the process control system from a device database associated with the process control system, and forming the second script based on the one or more first expressions and the identified vendor-specific information, to configure the multiple process controllers and process control devices for control.

2. The method as defined in claim 1, wherein the first script is to be compiled to form a third script structured in accordance with a second vendor-specific configuration language associated with a second process control system.

3. The method as defined in claim 1, wherein the first script is constructed in accordance with an extensible markup language.

4. The method as defined in claim 1, further comprising importing the second script into a process control system configuration database associated with the process control system.

5. The method as defined in claim 1, further comprising:
generating a process control system operation database based on the second script; and
configuring the process control system based on the operation database.

6. The method as defined in claim 1, wherein the first script defines a process controller, a process control element, an input/output gateway, an input/output card of the input/output gateway, a first communication path between the process controller and the input/output gateway, and a second communication path between the input/output card of the input/output gateway and the process control element.

7. The method as defined in claim 1, wherein a first of the physical communicative couplings comprises at least one of a wired or a wireless communication path.

8. The method as defined in claim 1, wherein the tokens include classifiable lexemes comprising at least one of a string of letters, a string of numbers, a punctuation mark, a mathematical operator, or any combination thereof, and the vendor-specific information includes vendor-specific configuration language expressions corresponding to the first expressions.

9. An apparatus comprising:
a processor; and
a memory storing machine-readable instructions that, when executed, cause the processor to implement:
an editor useable to create a first script defining a physical topology and control of a process control system including multiple process controllers and process control devices, the first script including tokens that have a type and value to define attributes of the multiple process controllers and process control devices, the topology representing physical communicative couplings between the multiple process controllers and the process control devices, the first script comprising an interpretable system-level vendor-independent schema; and
a compiler including:
a parser to identify one or more first expressions based on grammatical relationships between the tokens contained in the first script; and
an interpreter to:
retrieve vendor-specific information associated with the process control system from a device database associated with the process control system; and
form a second script based on the identified one or more first expressions and the retrieved vendor-specific information, the second script to configure the multiple process controllers and process control devices and structured in accordance with a first vendor-specific configuration language associated with the process control system.

10. The apparatus as defined in claim 9, wherein the first script is to be compiled to form a third script, the third script structured in accordance with a second vendor-specific configuration language associated with a second process control system.

11. The apparatus as defined in claim 9, wherein the first script is constructed in accordance with an extensible markup language.

12. The apparatus as defined in claim 9, further comprising:
a database populator to populate a process control system configuration database based on the second script; and
a database server to configure the process control system based on the process control system configuration database.

13. The apparatus as defined in claim 9, wherein the first script defines a process controller, a process control element, a input/output gateway, an input/output card of the input/output gateway, a first communication path between the process controller and the input/output gateway, and a second communication path between the input/output card of the input/output gateway and the process control element.

14. The apparatus as defined in claim 9, wherein a first of the physical communicative couplings comprises at least one of a wired or a wireless communication path.

15. The apparatus as defined in claim 9, wherein the tokens include classifiable lexemes including at least one of a string of letters, a string of numbers, a punctuation mark, a mathematical operator, or any combination thereof, and the vendor-specific information includes vendor-specific configuration language expressions corresponding to the first expressions.

16. A tangible article of manufacture comprising a computer-readable memory or storage disk storing machine readable instructions that, when executed, cause a machine to:
load a first script defining physical interconnections and control of process control devices, power supplies, and network components of a process control system, the first script comprising an interpretable system-level vendor-independent schema including tokens that have a type and value to define attributes of the process control devices, power supplies, and network components of the process control system; and
compile the first script to form a second script by identifying one or more first expressions based on the tokens in the first script, identifying vendor-specific information associated with the process control system from a device database, the device database including vendor-specific information associated with the process control devices, power supplies, and network components of the process control system, and forming the second script based on the identified one or more first expressions and the identified vendor-specific information, the second script structured in accordance with a vendor-specific configuration language associated with the process control system to configure the process control devices, power supplies, and network components of the process control system.

17. The article of manufacture as defined in claim 16, wherein the machine readable instructions, when executed, cause the machine to compile the first script to form a third script structured in accordance with a second vendor-specific configuration language associated with a second process control system.

18. The article of manufacture as defined in claim 16, wherein the machine readable instructions, when executed, cause the machine to import the second script into a process control system configuration database associated with the process control system.

19. The article of manufacture as defined in claim 16, wherein the machine readable instructions, when executed, cause the machine to:
   generate a process control system operation database based on the second script; and
   configure the process control system based on the operation database.

20. The article of manufacture as defined in claim 16, wherein the first script defines a process controller, a process control element, a input/output gateway, an input/output card of the input/output gateway, a first communication path between the process controller and the input/output gateway, and a second communication path between the input/output card of the input/output gateway and the process control element.

21. The article of manufacture as defined in claim 16, wherein a first of the physical interconnections comprises at least one of a wired or a wireless communication path.

22. The article of manufacture as defined in claim 16, wherein the first expressions include at least one of a string of letters, a string of numbers, a punctuation mark, a mathematical operator, a value, a type, or any combination thereof, and the vendor-specific information includes vendor-specific configuration language expressions corresponding to the first expressions.

* * * * *